US005291089A

United States Patent [19]

Snider et al.

[11] Patent Number: 5,291,089

[45] Date of Patent: Mar. 1, 1994

[54] LOW DRAG/HIGH FEED RATE BEARING WICK FOR A UNIT BEARING MOTOR

[75] Inventors: S. Duke Snider, St. Louis County; Stephen J. Burton, Jefferson County, both of Mo.

[73] Assignee: Emerson Electric Co., St. Louis, Mo.

[21] Appl. No.: 5,293

[22] Filed: Jan. 19, 1993

[51] Int. Cl.[5] ................................................ H02K 5/16

[52] U.S. Cl. ........................................ 310/90; 384/413

[58] Field of Search ............... 310/90, 42, 91; 384/13, 384/99, 192, 261, 385, 409, 413

[56] References Cited

U.S. PATENT DOCUMENTS

| | | | |
|---|---|---|---|
| 3,434,765 | 3/1969 | Abel | 384/413 |
| 4,209,722 | 6/1980 | Peachee | 310/90 |
| 4,243,079 | 1/1981 | Daniels | 341/1 |
| 4,350,912 | 9/1982 | Burton | 310/90 |
| 4,499,661 | 2/1985 | Peachee | 29/598 |
| 4,523,118 | 6/1985 | Cunningham | 310/90 |
| 4,800,309 | 1/1989 | Lakin | 310/42 |
| 5,108,199 | 4/1992 | Dwyer | 384/413 |

*Primary Examiner*—Steven L. Stephan
*Assistant Examiner*—Matthew Nguyen
*Attorney, Agent, or Firm*—Polster, Lieder, Woodruff & Lucchesi

[57] ABSTRACT

An electric motor includes a rotor body having a longitudinal central axis, a longitudinal central opening substantially coaxial with the central axis, a journal bearing which is received in the central opening, a rotor shaft rotatably journaled in the bearing, and a wicking element through which the rotor shaft is journaled. The wicking element is in wicking contact with a source of lubricant and the rotor shaft to deliver lubricant from the source of lubricant to the rotor shaft. The improved wicking element has an opening which positively contacts the rotor shaft at at least one point, and is spaced from the shaft throughout substantially the remainder of the periphery to provide a wick which will improve oil flow to the rotor to improve lubrication of the shaft. Further, the wick is made from a polyester-cotton blend textile which has relatively short fibers. These fibers will not readily separate from the wick.

18 Claims, 2 Drawing Sheets

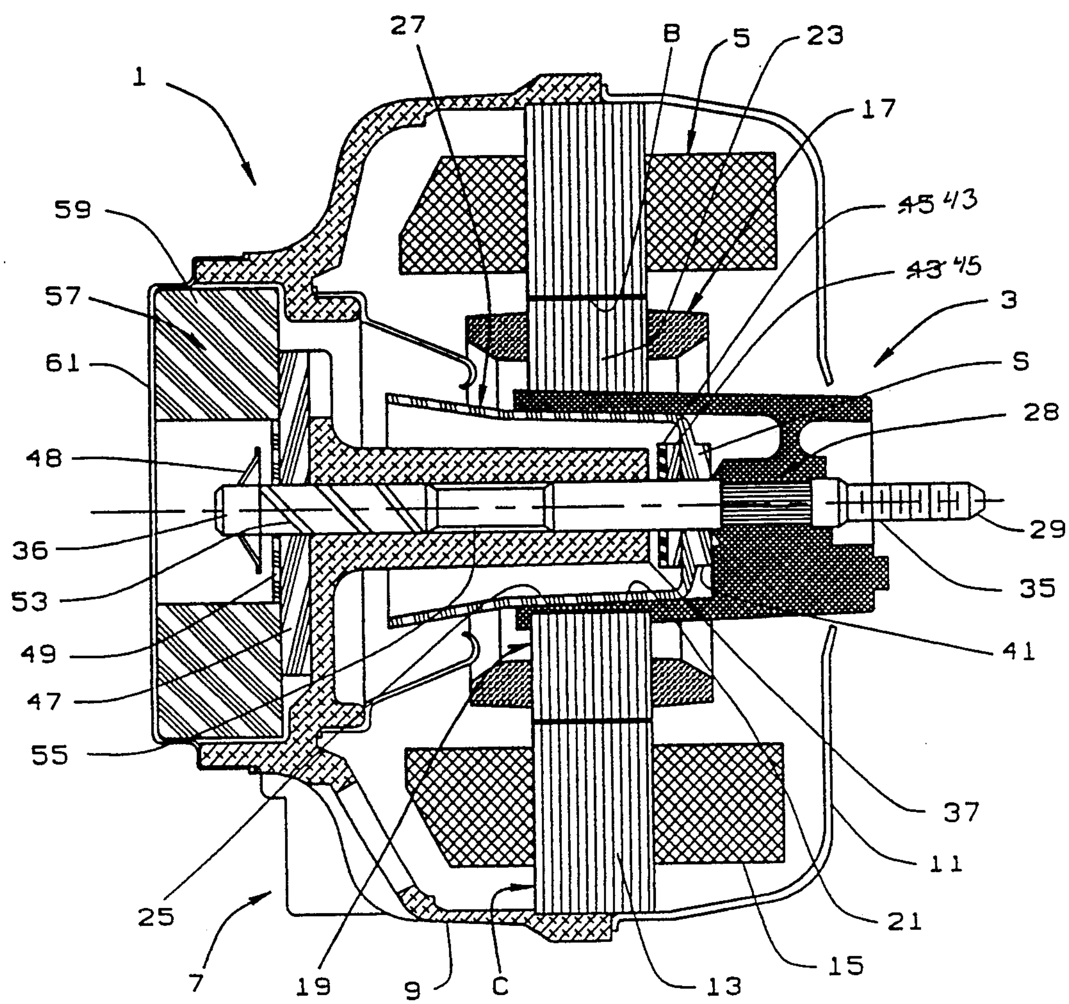
FIG. 1
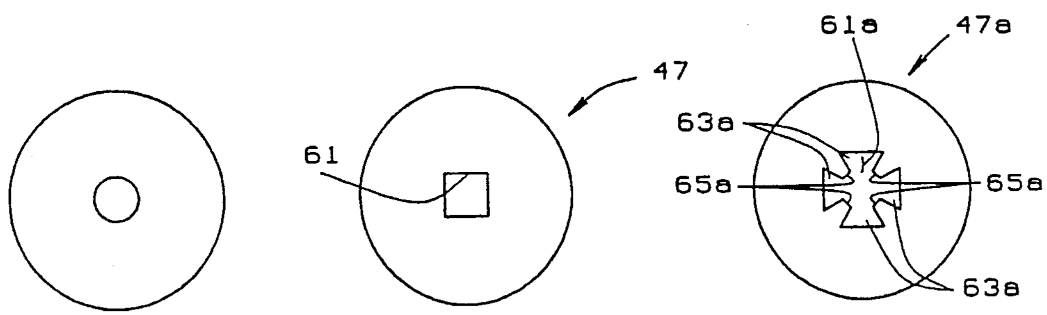
FIG. 2
PRIOR ART
FIG. 3
FIG. 4

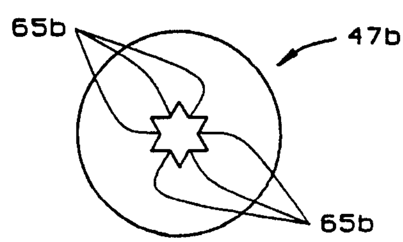
FIG. 5
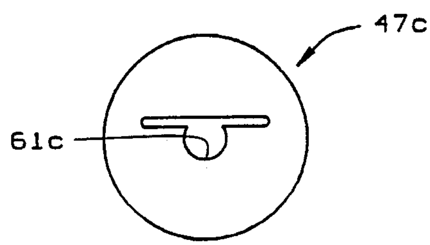
FIG. 6
FIG. 7
RPM VS. WICK CONFIGURATION
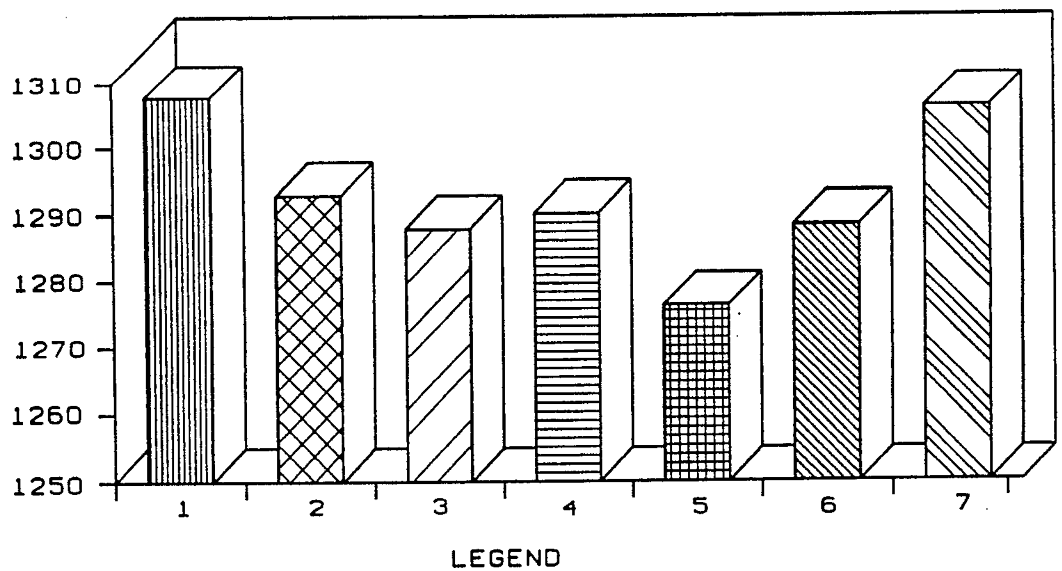
LEGEND
1 SINGED WOOL - FIG. 2, PRIOR ART
2 IRON CROSS - FIG. 4
3 SQUARE HOLE (THIN) - FIG. 3
4 SQUARE HOLE (THICK) - FIG. 3
5 SQUARE HOLE (TWO THIN) - FIG. 3
6 NO WICK OIL ADDED
7 NO WICK

LOW DRAG/HIGH FEED RATE BEARING WICK FOR A UNIT BEARING MOTOR

BACKGROUND OF THE INVENTION

This invention relates to unit bearing motors, and more particularly to a bearing wick for a unit bearing motor.

In certain dynamoelectric machines of the induction motor type, and particularly in many smaller motors, sometimes referred to as unit bearing motors, the motors have a squirrel cage rotor assembly in which the conductor bars for the rotor and the body of the rotor are made from die cast aluminum. Typically, these rotor assemblies include a stack or rotor core of individual laminations constructed from suitable ferro-magnetic material. Each lamination has a central opening and a plurality of so-called satellite openings adjacent its outer margin. The laminations are assembled in a stack and are rotated slightly with respect to one another in the stack so that their central openings are coaxial but so that their satellite openings are skewed relative to one another and so that the satellite openings constitute slots. The lamination stack or core is then placed in a suitable die casting mold and molten aluminum is injected under pressure into the mold so as to surround the core, to fill the mold, and to flow through the skewed slots in the core formed by the satellite openings so as to form the conductor bars of the rotor.

These die case squirrel cage rotors typically have a central opening therethrough and a rotor shaft extending through this opening which is rigidly secured to the rotor so that the shaft rotates with the motor. This central opening may be defined at least in part by the central opening of the laminations and is appreciably larger than the shaft so as to receive a rigid boss of the motor housing. The rotor shaft is received in an opening in the boss and is journaled therein by a suitable journal bearing or the like to rotatably support the rotor on the motor housing. As is typical, a portion of the rotor shaft journaled in the bearing has a helical oil groove formed on its outer surface and the outer end of the shaft rotates in a wick supplied with lubricating oil from a resevoir. Upon rotation of the rotor, the oil grooves in the shaft pick up oil from the wick and move it along the length of the bearing to lubricate it. Upon the oil being discharged from the inner end of the bearing, it is slung outwardly by the centrifugal force of the rotating rotor shaft.

In unit bearing motors currently available, the wick is formed as a washer and has a circular opening through which the rotor fits. The wick absorbs oil from the resevoir and brings the oil toward the wick's central opening where the oil is transferred to the rotor shaft. The oil is pumped by a spinal groove along the rotor shaft to lubricate the bearing. For the oil to be transferred to the rotor shaft, the rotor shaft must contact the wick. Generally, wicks used with such motors are made from fibers and cannot be formed to close specifications. If the opening is too large, the rotor shaft will not contact the wick and will not be adequately lubricated. If the opening is too small, the wick will create too much of a drag on the rotor and decrease performance. Oil is preferably delivered to the rotor shaft at a rate of at least 1.0 cc/hour. It has been found that the wicks currently used often deliver oil at a rate of less than 0.5 cc/hour.

Further, the wicks currently used are made of 100% wool. Wool has long fibers which come loose from the wick. These loose fibers then spool around the rotor shaft and freeze the motor.

SUMMARY OF THE INVENTION

It is therefore an object of this invention to provide a unit bearing motor that delivers oil to a bearing of the motor at a proper rate.

Another object is to provide such a wick for such a motor which contacts the rotor sufficiently enough to lubricate the rotor, but not enough to place a drag on the motor.

A third object is to provide such a wick which will not readily lose fibers.

These and other objects will become apparent to those skilled in the art in view of the following disclosure and accompanying drawings.

In accordance with the invention, generally stated an improved wick is provided a the motor. The wick is in the form of a washer and defines an opening through which the rotor is journaled. The opening, however, is shaped so that it positively contacts the rotor at at least one point and is spaced from the shaft throughout substantially the rest of the periphery of the opening. This provides a wick which greatly improves oil delivery to the rotor shaft and journal bearing, without increasing drag on the motor too much. Oil is delivered to the rotor shaft at a rate of at least 1.7 cc/hr, and reduces the drag on the motor by only 1-3% over the prior art wicks. It has been found that a square opening works best, however, other configurations operate effectively. Further, the wick is made from a polyester-cotton blend textile, rather than 100% wool. This provides a wick with relatively short fibers which will not readily separate from the wick to spool about the rotor shaft.

BRIEF DESCRIPTION OF THE DRAWINGS

FIG. 1 is a longitudinal cross-sectional view of s so-called unit bearing electric motor;

FIG. 2 is a plan view of a prior art bearing wick;

FIGS. 3-6 are plan views of alternate designs for bearing wicks incorporating the present invention; and FIG. 7 is a bar graph comparing the effectiveness of the wicks of FIGS. 3-6 against the currently available wick and the use of no wick.

DESCRIPTION OF THE PREFERRED EMBODIMENT

Referring now to the drawings, a squirrel cage electric motor, as indicated in its entirety at 1, includes a rotor assembly 3 for rotation within a stator assembly 5. More specifically, motor 1 is a so-called unit bearing motor having a motor housing 7 including a body 9 and a cover 11 secured to the body. Stator assembly 5 includes a stack of lamination plates 13 constituting a stator core C. The core has a bore B therein and blind slots (not shown) extending outwardly from the bore for reception of coils of wire as indicated at 15, constituting the windings of the stator.

Rotor assembly 3 includes a rotor core 23 constructed from a plurality of laminations 19. Each of these laminations has a central opening 21 and a plurality of so-called satellite openings (not shown) adjacent its outer margin. The laminations are rotated relative to one another in the core so that the satellite openings form skewed slots. Rotor conductor bars (not shown) pass through the core's skewed slots. These rotor conductor bars are integral with end rings 17 at the ends of the rotor core. Rotor assembly 3 further has a longitudinal central opening 25 extending therethrough. Central opening 21 of core 19 constitutes a portion of rotor body central opening 25.

As generally indicated a 27, an oil return/rotor shaft securement member is contained in rotor core 23. A rotor shaft 29 is fixedly secured within a member 28 and the shaft extends out beyond at least one end of the rotor. One end of the shaft is threaded, as indicated at 35, for attachment of a fan or the like. The other end 36 of the shaft is adapted to be received in a bearing 37 for journaling the rotor for rotation about the longitudinal axis of the shaft. Since motor 1 has only a single bearing, it is oftentimes referred to as a unit bearing motor.

As indicated at 41, a spacer surrounds shaft 29 adjacent a shoulder S in member 28. A thrust washer 43 also surrounds the shaft and faces toward the inner end of bearing 37, and a cushion washer 45 of rubber or the like is disposed between the spacer washer and thrust washer. A washer 47 of suitable wicking material surrounds the outer end of shaft 29 and bears against the outside of body 9. A push nut 48 is applied to the outer end of shaft 29 with a thrust washer 49 disposed between the push nut and wick washer. Thus, the push nut 48 securely holds rotor assembly 3 within body 9.

Shaft 29 has a helical oil groove 53 formed thereon at shaft end 36 and is undercut, as indicated at 55. A lubricated oil reservoir, as generally indicated at 57, is provided on the motor for supplying lubricating oil to shaft 29 for lubrication of the journal bearing 37. This oil resevoir comprises a storage wick 59, held in place on body 9 by means of a cap 61. Storage wick 59 holds a quantity of oil and is in lubrication communication with washer wick 47 for feeding oil thereto. Wick washer 47 is in engagement with shaft 29 which passes therethrough and feeds oil onto the shaft. Oil grooves 53 on the shaft pick up oil from wick washer 47 and feed it along the shaft to lubricate bearing 37 when the shaft is rotated. Oil fills the undercut portion 55 of the shaft and is forced over the remainder of the length of the shaft as additional oil is forced into the undercut area by the oil groove. As oil is forced out of the inner end of bearing 37, it is flung outwardly by the centrifugal force of the rotating rotor shaft. This oil is returned to resevoir 57 by an oil return, such as is described in U.S. Pat. Nos. 4,499,661 and 4,209,722, both to Peachee, Jr, which are assigned to the same assignee as this invention, and which are incorporated herein by reference.

A preferred embodiment of the wick washer 47 is shown in plan in FIG. 3. Washer 47 is preferably about one-eighth of an inch thick and defines an opening 61. Opening 61 is square and is sized to contact the rotor shaft 29 at approximately four points, i.e. in the center of its edges, and is clear of the rotor shaft at its corners. This provides a design which will positively contact the rotor shaft to supply lubricating oil thereto, but does not place too great a drag on the motor, because it does not contact the shaft substantially throughout the periphery of the opening 61, as occurs with the round opening of the commercially available wick, shown in FIG. 2.

The improved oil delivery of the wick of FIG. 3 over the prior art wick of FIG. 2 is shown in tables 1 and 2 below.

TABLE I

OIL DELIVERY RATES FOR PRIOR ART WICK

| TEST NO. | OIL DELIVERY GM/HR | OIL DELIVERY CC/100 HRS |
|---|---|---|
| 1 | 2.11 | 119.89 |
| 2 | 0.51 | 28.98 |
| 3 | 1.6 | 90.91 |
| 4 | 2.06 | 117.05 |
| 5 | 0.64 | 36.36 |
| 6 | 0.53 | 30.11 |
| 7 | 3.53 | 200.57 |
| 8 | 1.95 | 110.80 |
| 9 | 2.41 | 136.93 |
| 10 | 2.7 | 153.41 |
| AVERAGE | 1.80 | 102.50 |
| STANDARD DEVIATION | 1.00 | 56.89 |
| RANGE | 3.00 | 170.45 |

TABLE II

OIL DELIVERY RATES FOR SQUARE HOLED WICK

| TEST NO. | OIL DELIVERY (GM/2 HR) | OIL DELIVERY CC/100 HRS |
|---|---|---|
| 1 | 4.05 | 230.11 |
| 2 | 3.93 | 223.30 |
| 3 | 3.12 | 177.27 |
| 4 | 4.23 | 240.34 |
| 5 | 3.67 | 208.52 |
| AVERAGE | 3.80 | 215.91 |
| STANDARD DEVIATION | 0.43 | 24.50 |
| RANGE | 1.11 | 63.07 |

As can be seen, the average rate for the wick having a square hole is more than twice as great as the oil delivery rate as the prior art wick. By designing the wick to contact the shaft positively thus greatly improves oil delivery to the rotor shaft and thus enhances lubrication of bearing 37, increasing life of the bearing.

FIG. 4 shows an alternative design 47A for the wick. Wick 47A defines an opening 61A generally in the shape of an iron cross. It has four portions 63A which radiate outwardly from the center of the opening to form arms 65A. Arms 65A contact the rotor shaft 29 to deliver oil to the bearing. Arms 65A are flexible and bend when in contact with the rotor. This provides good contact with the rotor, but, because they do not rigidly press against the rotor, they do not place too much drag on the motor.

FIGS. 5 and 6 show two other alternative designs 47B and 47C, respectively. Wick 47B defines an opening in the shape of a regular six-point star. This provides six points 65B where the wick contacts the rotor shaft 29.

Wick 47C defines a circular opening 61C with an elongate slot across the top thereof. This design has a much larger surface area which contacts the rotor shaft. It thus places more drag on the motor than the other designs.

Table III, below, is a comparison of the rotational rate of the various designs to show the differing amount of drag placed on the motor by each design as indicated by the rotational rate of the motor.

TABLE III

MOTOR SPEED FOR VARIOUS WICK DESIGNS

| WICK TYPE | | RPM |
|---|---|---|
| PRIOR ART | FIG. 2 | 1309 |
| IRON CROSS | FIG. 4 | 1293 |
| SQUARE HOLE ($\frac{1}{2}$ THICKNESS) | FIG. 3 | 1288 |

TABLE III-continued

MOTOR SPEED FOR VARIOUS WICK DESIGNS

| WICK TYPE | | RPM |
|---|---|---|
| SQUARE HOLE (FULL THICKNESS) | FIG. 3 | 1290 |
| SQUARE HOLE (2 OF ½ THICKNESS) | FIG. 3 | 1274 |
| NO WICK - OIL ADDED | | 1288 |
| NO WICK | | 1308 |

The results charted in Table III are graphed in FIG. 7. As can be seen, the use of the prior art wick and no wick produce the least amount of drag. However, as can be appreciated, when no wick is used, the rotor shaft is not lubricated. Further, as shown above in connection with Table I, the prior art wick does not adequately lubricate the rotor. This inadequate lubrication of the rotor shaft is not desirable—it can reduce the effective life of the motor. Thus, a small percentage drop in the rotational rate is given up to greatly increase the delivery rate of oil to the rotor shaft. The drop in rotational rate was the greatest when two half width square hole washers were used, and this was only about 3%. The drop was the smallest for the iron cross design (FIG. 4), which had a drop in rotational rate of only about 1%.

Thus, taking Tables I to III in conjunction, it is seen that the wick of the present invention can greatly improve the overall performance of the motor.

Further, the wick is preferably made from about 45–50% polyester and 50–55% wool, preferably 45% polyester and 55% wool. This provides a wicking element that has generally short fibers which will not separate from the wick as readily as longer fibers, such as wool fibers in a 100% wool wick which is commonly used presently. This reduces the chances of the fibers from spooling around the shaft and freezing the motor. Consequently, this makeup can prolong the life of the motor.

As can be appreciated, the wick 47 greatly enhances the flow of oil to the bearing, without greatly increasing the drag on the motor and will not separate as quickly as presently available 100% wool wicks. The wick of the present invention can thus enhance both the operation and operating life of the motor.

The foregoing description is set forth for illustrative purposes only. Variations, within the scope of the appended claims, may be apparent to those skilled in the art. For example, the wick will be made of other textiles which have short fibers. The design of the opening may also be changed to provide other configurations wherein the edge of the opening positively contacts the rotor shaft at only a few points, and is otherwise spaced from the shaft for substantially its entire periphery. These variations are only illustrative.

We claim:

1. In a dynamoelectric machine comprising a rotor body having a longitudinal central axis, a longitudinal central opening substantially coaxial with said central axis, a journal bearing which is received in said central opening, a rotor shaft rotatably journaled in said bearing, and a wicking element through which said rotor shaft is journaled, said wicking element being in wicking contact with a source of lubricant and said rotor shaft to deliver lubricant to said rotor shaft; the improvement comprising said wicking element defining an opening having a periphery, said periphery positively contacting said rotor shaft at at least one point, and being spaced from said shaft throughout substantially the remainder of said periphery, the positive point of contact being substantially less than the circumference of said shaft.

2. The improvement of claim 1 wherein wherein said opening is a regular polygon.

3. The improvement of claim 2 wherein said opening is a square.

4. The improvement of claim 1 wherein said periphery defines at least one arm extending radially inwardly.

5. The improvement of claim 4 wherein said at least one arm is flexible.

6. The improvement of claim 1 wherein said wicking element is formed from a textile having short fibers.

7. The improvement of claim 6 wherein said textile is a polyester-cotton blend.

8. The improvement of claim 7 wherein said textile is approximately 45–50% polyester and approximately 50–55% wool.

9. The improvement of claim 8 wherein said textile is approximately 45% polyester and approximately 55% wool.

10. A wicking element for a unit bearing dynamoelectric machine, the dynamoelectric machine comprising a rotor body having a longitudinal central axis, a longitudinal central opening substantially coaxial with said central axis, a journal bearing which is received in said central opening, a rotor shaft rotatably journaled in said bearing, and said wicking element through which said rotor shaft is journaled, said wicking element being in wicking contact with a source of lubricant and said rotor shaft to deliver lubricant to said rotor shaft; said wicking element defining an opening having a periphery, said periphery positively contacting said rotor shaft at at least one point, and being spaced from said shaft throughout substantially the remainder of said periphery, said wicking element delivering lubricant to said shaft at a rate at least as great as 1.77 cc/hr.

11. The wicking element of claim 10 wherein wherein said opening is a regular polygon.

12. The wicking element of claim 11 wherein said opening is a square.

13. The wicking element of claim 10 wherein said periphery defines at least one arm extending radially inwardly.

14. The wicking element of claim 13 wherein said at least one arm is flexible.

15. The wicking element of claim 10 wherein said wicking element is formed from a textile having short fibers.

16. The wicking element of claim 15 wherein said textile is a polyester-cotton blend.

17. The wicking element of claim 16 wherein said textile is approximately 45–50% polyester and approximately 50–55% wool.

18. The wicking element of claim 17 wherein said textile is approximately 45% polyester and approximately 55% wool.

* * * * *